United States Patent [19]

Nishimae et al.

[11] Patent Number: 5,048,048

[45] Date of Patent: Sep. 10, 1991

[54] GAS LASER DEVICE

[75] Inventors: Junichi Nishimae; Kenji Yoshizawa; Masakazu Taki, all of Hyogo, Japan

[73] Assignee: Mitsubishi Denki K.K., Tokyo, Japan

[21] Appl. No.: 564,517

[22] Filed: Aug. 9, 1990

[30] Foreign Application Priority Data

| Aug. 11, 1989 | [JP] | Japan | 1-206978 |
| Jan. 10, 1990 | [JP] | Japan | 2-2859 |
| Jan. 12, 1990 | [JP] | Japan | 2-3550 |

[51] Int. Cl.$^5$ ............................................. H01S 3/08
[52] U.S. Cl. ............................................ 372/95; 372/64
[58] Field of Search .................. 372/103, 108, 66, 64

[56] References Cited

U.S. PATENT DOCUMENTS

| 3,969,685 | 7/1976 | Chenausky et al. | 372/95 |
| 4,123,149 | 10/1978 | Chenausky et al. | 372/95 |
| 4,446,556 | 5/1984 | Koepf | 372/95 |
| 4,939,738 | 7/1990 | Opower | 372/95 |
| 4,942,588 | 7/1990 | Yasui et al. | 372/95 |

Primary Examiner—Frank Gonzalez
Assistant Examiner—Susan S. Morse
Attorney, Agent, or Firm—Sughrue, Mion, Zinn, Macpeak & Seas

[57] ABSTRACT

A gas laser device comprises a discharge space in which a laser gas is excited by electric discharge, the discharge space being in the form of a slab whose section perpendicular to a laser optical axis has a longer side and a shorter side; and laser resonator mirrors disposed at both ends of the discharge space, respectively. The laser resonant mirrors constitute a negative branch unstable resonator in a first dimension of longer side of the discharge space section, and a laser beam is obtained at one end of the longer side of the discharge space section.

6 Claims, 6 Drawing Sheets

GAS LASER DEVICE

BACKGROUND OF THE INVENTION

FIG. 9 is a sectional view outlining the arrangement of a conventional gas laser device disclosed by Japanese Patent Application (OPI) No. 192285/1988 (the term "OPI" as used herein means an "unexamined published application"). FIG. 10 is a plan view outlining a resonator in the laser device. In these figures, reference numeral 11 designates a 72 MHz high frequency generator; 21, a power matching circuit; 22, a high frequency cable; 23, an insulating feed-through; 71 and 72, electrodes; 73 and 74, the surfaces of the electrodes, which are polished into optical reflecting surfaces; 75, a discharge gap; 76 and 77, spacers insulating the electrodes 71 and 72 from each other; and 78, a U-shaped base. The electrodes 71 and 72 with the spacers 76 and 77 are mounted on the base 78, and the latter 78 is closed with a cover 79 in such a manner that a ceramic insulator is disposed between the cover 79 and the electrode 71. The laser resonator, as shown in FIG. 10, is made up of a total reflection mirror 52 having a concave surface and a total reflection mirror 53 having a convex surface.

In the conventional gas laser device thus constructed, the high frequency generated by the high frequency generator 11 is applied through the power matching circuit 21 and the cable 22 to the discharge gap 75 between the electrodes 71 and 72. The discharge gap is filled with laser gas, and therefore the laser gas is discharge-excited by the high frequency thus applied. That is, the laser gas thus excited is present in the laser resonator comprising the reflection mirrors 52 and 53, so that a laser oscillation is carried out. In this operation, a square beam about $2 \times 2$ mm$^2$ can be obtained by setting the distance between the electrodes 71 and 72 to 2 mm and by setting the distances between the edges of the electrodes 71 and 72 and the edge of the convex mirror 53 to 2 mm. This square beam is converted into a Gaussian circular beam at a certain distance from the laser resonator.

In the above-described conventional gas laser device, its laser resonator is a so-called "positive branch unstable resonator comprising a concave mirror and a convex mirror. Therefore, the resonator is considerably sensitive to the inclination of the reflection mirrors; that is, it is difficult to adjust the inclination of the reflection mirrors. And the adjustment is liable to change for instance because the mirrors are deformed as their temperature changes. Thus, the conventional gas laser device suffers from a difficulty that the resonator is poor in stability.

SUMMARY OF THE INVENTION

Accordingly, an object of this invention is to eliminate the above-described difficulties accompanying a conventional gas laser device. More specifically, an object of the present invention is to provide a gas laser device which is not sensitive to the inclination of the reflection mirrors whereby the inclination of the latter can be adjusted with ease, and which is excellent in stability.

A further object of the present invention is to provide a high efficiency gas laser device utilizing microwave discharge in which a one-dimensional unstable resonator is used.

In a gas laser device according to the invention, a discharge space is in the form of a slab whose section perpendicular to the laser optical axis has vertical and horizontal dimensions different from each other, and laser resonator mirrors which are concave mirrors are disposed at both ends of the discharge space, respectively, so that a negative branch unstable resonator is formed for a one dimension which is the longer side of the discharge space section, and a laser beam is obtained at one end of the longer side of the discharge space section.

Further, in a gas laser device according to the invention, a groove is formed in a conductor wall forming a part of the microwave circuit in such a manner that the groove is located between the conductor wall and a dielectric member confronting with the conductor wall, to form a discharge space whose section perpendicular to the laser beam axis has vertical and horizontal dimensions different from each other. In the one dimension which is the longer side of the section of the discharge space, an unstable resonator is formed with a total reflection mirror and an exit total reflection mirrors. An output laser beam is obtained at one end of the longer side which is on the exit total reflection mirror side, and the distance between the end of the laser mode region and the end of the exit total reflection mirror is made substantially equal to the dimension of the shorter side of the section of the discharge space.

Furthermore, the laser mode region of the unstable resonator is spaced at least 1 mm from the wall of the groove which forms the shorter side thereof. In addition, a ridge is formed on a conductor wall confronted through the dielectric member with the groove, and the width of at least the end portion of the ridge is made smaller than the width of the groove, so that a region for producing the plasma in the discharge space is substantially coincided with the laser mode region.

In the gas laser device according to the invention, the negative branch unstable resonator is formed in the one dimension which is the longer side of the section of the discharge space, and therefore, the light is concentrated at one line instead of one point although the focal point located inside the resonator. Hence, the intensity of the laser beam at focal point is greatly reduced when compared with that in the case where the negative branch unstable resonator is applied as the ordinary cylinder-axis-symmetry resonator. As a result, the difficulty such as optical damage which is caused by the concentration of light is eliminated, and the specific feature of the negative branch unstable resonator that is not so sensitive to inclination of the mirrors can be maximumly utilized.

Further, in the gas laser device utilizing the microwave discharge, in the one dimension which is the longer side of the section of the discharge space, the unstable resonator is formed with the total reflection mirror and the exit total reflection mirrors, the output laser beam is obtained at the end of the exit total reflection mirror, and the distance between the outermost part of the laser mode region and the end of the exit total reflection mirror is made substantially equal to the dimension of the shorter side of the section of the discharge space. Therefore, the vertical and horizontal diameters of the output laser beam are substantially equal to each other.

Furthermore, the laser mode region is spaced at least 1 mm from the wall of the groove which is the shorter side thereof. Therefore, the output laser beam will not strike against the wall forming the short side of the groove. Furthermore, the laser beam will not go through the region which is within 1 mm from the wall forming the short side where electric discharge occurs scarcely and no laser active medium is provided, with the result that the loss of the laser beam is minimized. In addition, the ridge is formed so that the plasma producing region where the laser active medium is provided is substantially coincided with the laser mode region. Hence, laser energy can be obtained from the excited medium with high efficiency.

DETAILED DESCRIPTION OF THE INVENTION

Preferred embodiments of this invention will be described with reference to the accompanying drawings.

Figure 1A:
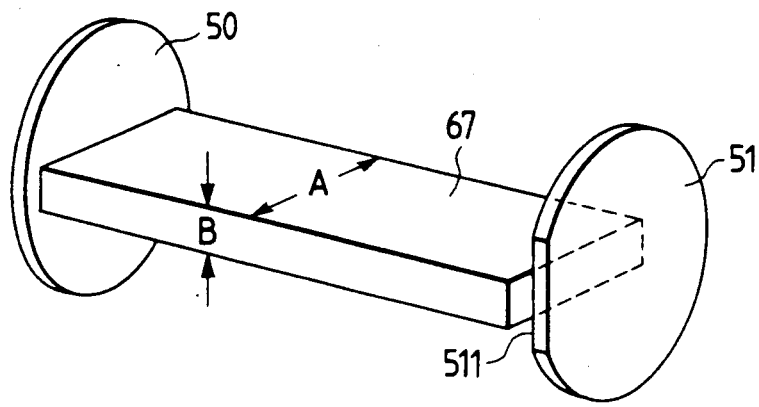
FIG. 1 (a) is a perspective view showing a resonator in a first embodiment of this invention, FIG. 1 (b) is a plan view showing the arrangement on the unstable resonator side of the resonator shown in FIG. 1 (a), FIG. 1 (c) is a side view showing the arrangement on the optical waveguide side of the resonator shown in FIG. 1 (a)
Figure 1B:
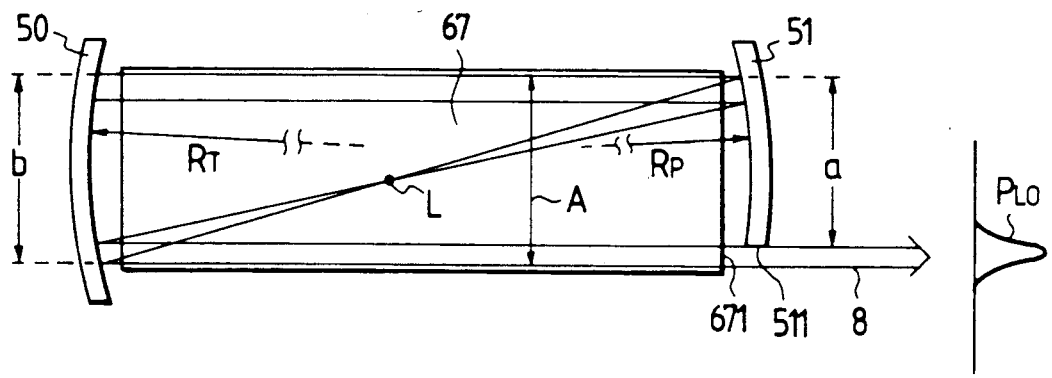
Figure 1C:
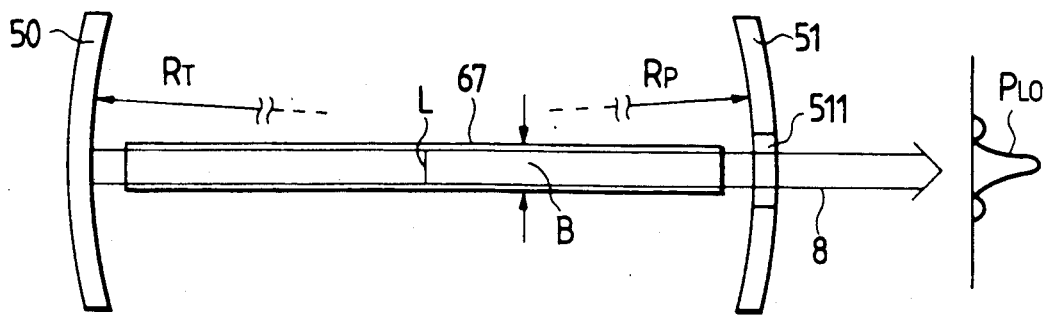

FIG. 1(a) is a perspective view showing a resonator in a first embodiment of this invention, FIG. 1(b) is a plan view outlining the unstable resonator side of the resonator shown in FIG. 1(a), and FIG. 1(c) is a side view outlining the optical waveguide resonator side of the resonator shown in FIG. 1(a).

Figure 9:
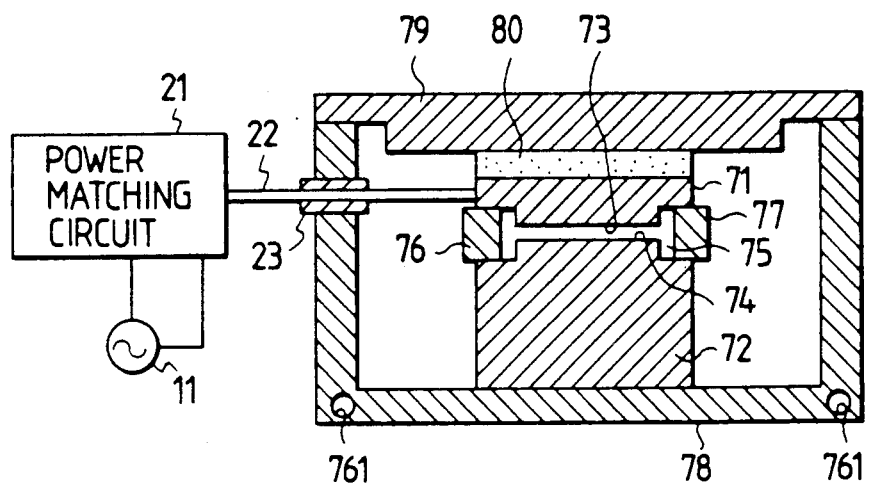
FIG. 9 is a sectional view outlining the arrangement of a conventional gas laser device.

In FIGS. 1(a), 1(b) and 1(c), reference numeral 50 designates a total reflection mirror of concave mirror; 51, an exit total reflection mirror of concave mirror; and 67, a discharge space corresponding to the discharge gap 75 between the electrodes 71 and 72 in FIG. 9. The discharge space 67 is in the form of a slab; that is, the vertical and horizontal dimensions A and B of its section perpendicular to the laser beam axis are different from each other. The dimension B is that of the optical waveguide with respect to the laser wavelength. In the figures, only the contour of the discharge space 67 is shown for simplification in illustration.

The resonator thus constructed is a negative branch unstable resonator with respect to the one dimension that is the longer side of the discharge space section; i.e., with respect to the direction A in FIG. 1(a), and an optical waveguide resonator with respect to the one dimension that is the shorter side of the discharge space section; i.e., with respect to the direction B.

In the negative branch unstable resonator, the laser beam axis is shifted from the central axis of the discharge space as a laser beam 8 is obtained from only one end 671 of the longer side of the discharge space section. More specifically, at least one of the mirrors 50 and 51 are inclined with respect to the central axis of the discharge space. The mirror 51 is provided with a laser beam take-out means 511, which, in the embodiment, is a linear aperture formed in a part of the mirror 51.

In FIG. 1, reference character $P_{LO}$ designates the distribution of intensity of a laser beam obtained through the mirror 51; $R_T$, the radius of curvature of the mirror 50; $R_P$, the radius of curvature of the mirror 51, and a and b, the effective lengths of the mirrors 51 and 50.

Now, the sensitivity of the unstable resonator to a mechanical variation; i.e., the inclination of the mirrors (hereinafter referred to as "the misalignment of the mirrors", when applicable) will be described.

Figure 2:
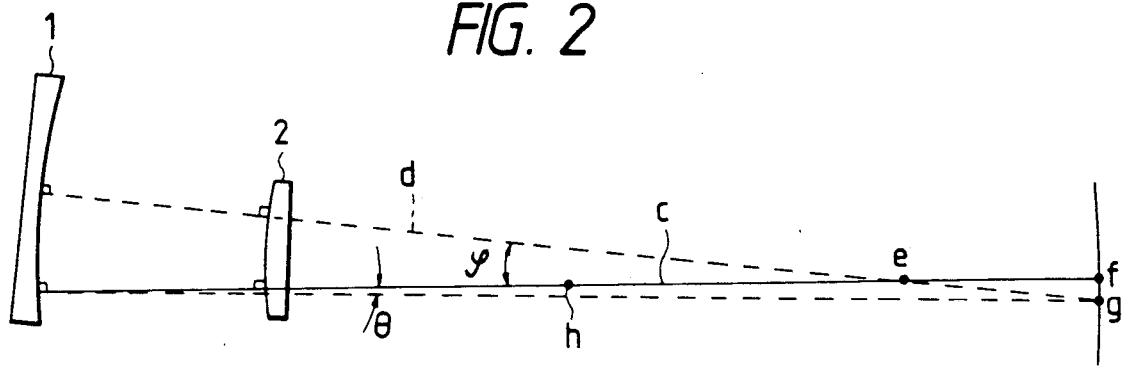
FIG. 2 is an explanatory diagram for a description of the misalignment sensitivity of a positive branch unstable resonator.
Figure 3:
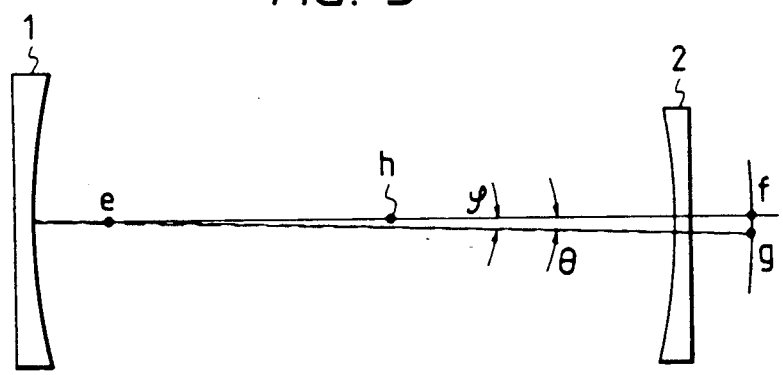
FIG. 3 is an explanatory diagram for a description of the misalignment of a negative branch unstable resonator.
Figure 10:
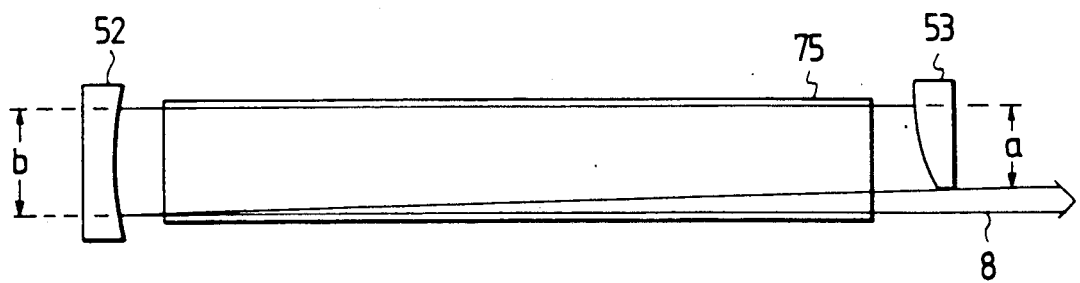
FIG. 10 is a plan view outlining the arrangement of a resonator in the gas laser device shown in FIG. 9.

FIG. 2 is an explanatory diagram for a description of the misalignment sensitivity of a positive branch unstable resonator. FIG. 3 is an explanatory diagram for a description of the misalignment sensitivity of a negative branch unstable resonator. In FIG. 2, reference numerals 1 and 2 designate mirrors which correspond to the mirrors 52 and 53 in FIG. 10. In FIG. 3, reference numerals 1 and 2 also designate mirrors which correspond the mirrors 50 and 51 in FIG. 1. In FIGS. 2 and 3, reference character e designates the center of curvature of the mirror 2; f, the center of curvature of the mirror 1 positioned in place; g, the center of curvature of the mirror 1 shifted; h, the focal point; θ, the angle of shift of the mirror 1; and φ, the angle of shift of the optical axis. The optical axis c is a line extended through the center of curvature; that is, it is a line perpendicular to both of the mirror surfaces. When the mirror 1 is shifted; i.e., when the mirror 1 is inclined, the optical axis is changed from e-f to e-g. Further in FIGS. 2 and 3, reference character d designates the optical axis thus shifted.

The sensitivity M to the misalignment of the unstable resonator is represented by the following equations (1) through (3) as described in the society publication (IEEE JOURNAL OF QUANTUM ELECTRONICS, DECEMBER 1969, p. 579):

$$M = \phi/\theta \quad (1)$$

$$M_+ = 2m/(m-1) \text{ (positive branch)} \quad (2)$$

$$M_- = 2m/(m+1) \text{ (negative branch)} \quad (3)$$

where m is the magnification factor and in a confocal resonator, the mirror curvature ratio:

$$m = R_1/R_2 \text{ (negative branch)} \quad (4)$$

$$m = -R_1/R_2 \text{ (positive branch)} \quad (5)$$

where $R_1$ and $R_2$ are the radii of curvatures of the mirrors 1 and 2. Equation (5) is negative because the convex curvature and the concave curvature are distinguished with signs ±.

Geometrically, m is the ratio of the effective lengths (a and b in FIGS. 1 and 10) of the mirrors which are limited by the edge and the aperture.

$$m = b/a \qquad (6)$$

The term "mirror effective length" as used herein is intended to mean the part of the mirror which is irradiated by light, being limited by the edge and the aperture (in the case of an axis-symmetrical mirror, its effective diameter). That is, the term magnificant factor means the ratio of the size of a beam enlarged to that of the beam not enlarged yet in the resonator.

In one example of a $CO_2$ laser manufactured according to FIG. 1 by way of trial, the discharge space length was 400 mm, the sectional dimensions were 2 mm × 20 mm, and the magnificant factor was set to about 1.1 so that both a suitable output coupling 10% and the symmetric property of an emergent beam are obtained. In this case, $M_+ \simeq 22$, and $M_- \simeq 1$.

Accordingly, the misalignment sensitivity of the negative branch is 1/22 of that of the positive branch. That is, the negative branch is much less than the positive branch in the amount of shift of the optical axis caused by inclination of the mirror. Hence, it is much less in the deviation of the field of light formed by the resonator from the active medium excited by electric discharge. Thus, the resonator is excellent in stability.

In the invention, the magnificant factor m is defined only on the unstable side (of the sectional dimension A), and it does not concern the optical waveguide side (of the sectional dimension B).

Figure 4:
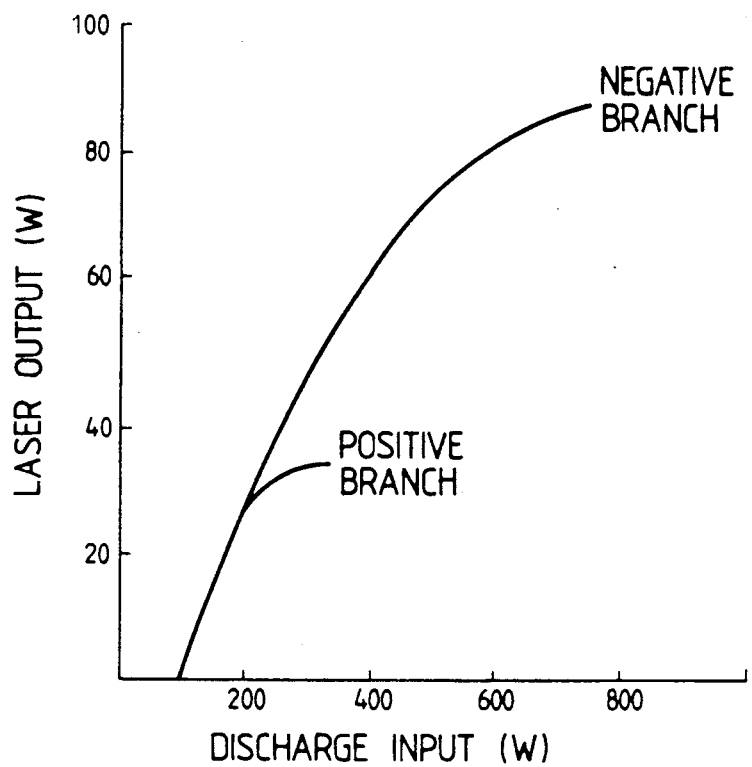
FIG. 4 is a graph showing characteristics of a $CO_2$ laser resonator of a positive branch unstable resonator and that of a negative branch unstable resonator, FIG. 5 (a) is a plan view outlining the arrangement on the unstable resonator side of a resonator in a second embodiment of the invention, FIG. 5 (b) is a side view outlining the arrangement on the open resonator side of the resonator shown in of FIG. 5 (a)

In general, the negative branch unstable resonator is scarcely employed, because the focal point is provided inside the resonator, and therefore if the resonator is applied to an ordinary cylinder-axis-symmetry resonator, then light is concentrated at one point, thus optically damaging the resonator. On the other hand, in the invention, a negative branch unstable resonator is used in a resonator which is not an ordinary cylinder-axis-symmenty resonator and in which an optical waveguide resonator is constituted in one dimention that is the shorter side of the discharge space section. Therefore, the focal point is provided inside the resonator; however, light is concentrated at one line instead of one point as indicated at L in FIGS. 1(b) and 1(c). As a result, the intensity of the laser beam at focal point is greatly reduced when compared with that in the case where the negative branch unstable resonator is used in the ordinary cylinder-axis-symmetry resonator, the problem attributing to the concentration of light is solved, and the specific feature of the negative branch unstable resonator that is not so sensitive to inclination of the mirror can be maximumly utilized. In the above-described example, as shown in FIG. 4, in the positive branch unstable resonator, when an output exceeds about 25 W, the mode is affected by the distortion of the mirror and the output is saturated; whereas in the negative branch unstable resonator, an output of more than 80 W can be obtained.

In the negative branch unstable resonator, the mirror curvature radius is smaller, and therefore the curvature is larger. So the curvature error with respect to the same manufacturing mechanical error is smaller. With the same manufacturing mechanical error (accuracy), the error (accuracy) of the radius of curvature is increased substantially in the rate of the square of the aimed radius of curvature. Thus, the negative branch unstable resonator is more advantageous in mirror manufacturing accuracy. For instance in the case of the above-described $CO_2$ laser, mirrors 30 mm in diameter are used with a manufacturing error of ±0.5 μm. In the case of the negative branch unstable resonator, the curvature is about 400 mm, and the error is ±0.5 mm. On the other hand, in the case of the positive branch unstable resonator, the curvature is about 9000 mm, and the error is ±200 mm, and the deviation from the confocal condition is large, and the magnification factor is deviated, from the target value. As the result the control of the output beam cannot be performed as designed.

Figure 5A:
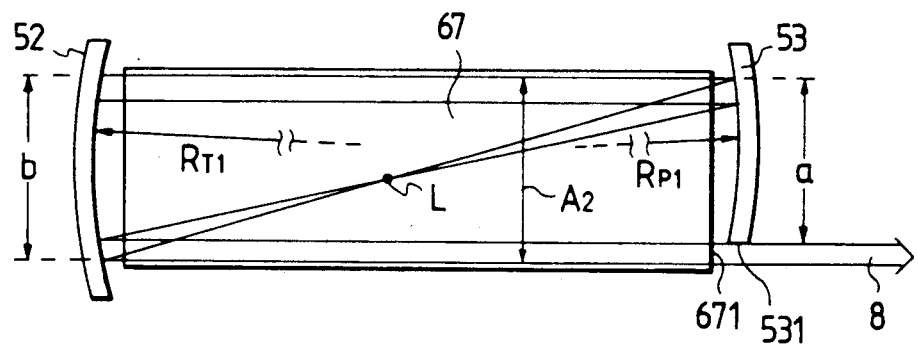
Figure 5B:
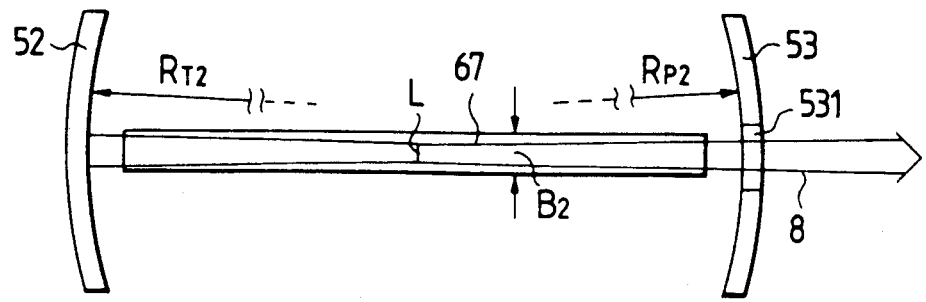

FIGS. 5(a) and 5(b) corresponding respectively to FIGS. 1(b) and 1(c), show a resonator in a second embodiment of the invention. A perspective view (not shown) of the resonator is the same as that shown in FIG. 1(a). In the second embodiment, as shown in FIG. 5(a), in the one dimension of the longer side of the section, a negative branch unstable resonator is provided similarly as in FIG. 1(b), while instead of the optical waveguide resonator, an ordinary open resonator as shown in FIG. 5(b) is provided in the other dimension. In the resonator, the output laser beam 8 is obtained at one end of the longer side of the section of the discharge space between a total reflection mirror 52 and an exit total reflection mirror 53.

In the second embodiment, in the one dimension which is the longer side of the discharge space section, as shown in FIG. 5(a), radii of curvature $R_{T1}$ and $R_{P1}$ of the two concave mirrors are set to suitable value so that a negative branch unstable resonator similar to that which has been described above is provided. In the other one dimension, as shown in FIG. 5(b), radii of curvature $R_{T2}$ and $R_{P2}$ of the concave mirrors are set to suitable values so that the electrode surface is not irradiated by the laser beam and the beam diameter is smaller than the shorter dimension $B_2$ of the discharge space section. That is, the resonator mirrors are so-called "toroidal mirrors" that the curvatures in the direction of the longer side of the discharge space section are different from those in the direction of the shorter side.

In the second embodiment also, similarly as in the case of FIG. 1, the negative branch unstable resonator is applied as an resonator which is not the ordinary cylinder-axis-symmetry resonator. Therefore, the focal point is provided inside the resonator; however, light is concentrated at one line instead of one point. Thus, the resonator has the same effects as that shown in FIG. 1.

Figure 6:
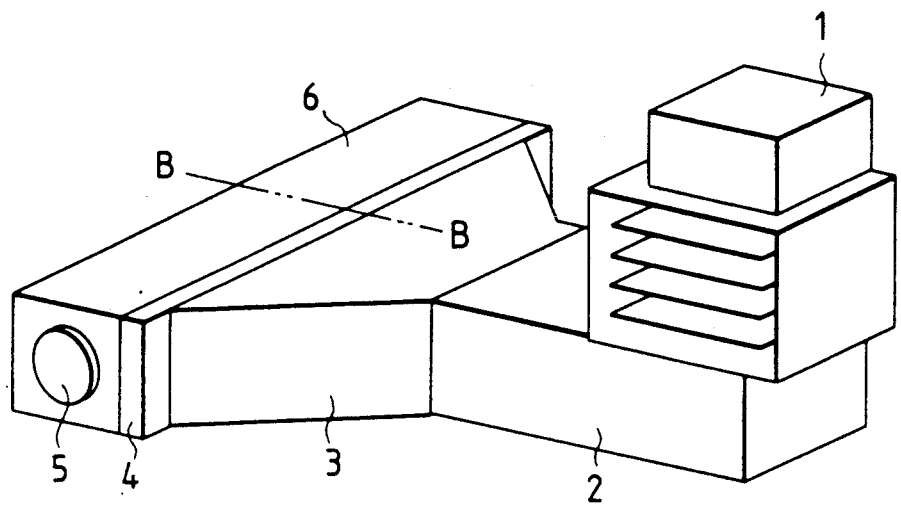
FIG. 6 is a perspective view showing a gas laser device utilizing the microwave discharge.
Figure 7:
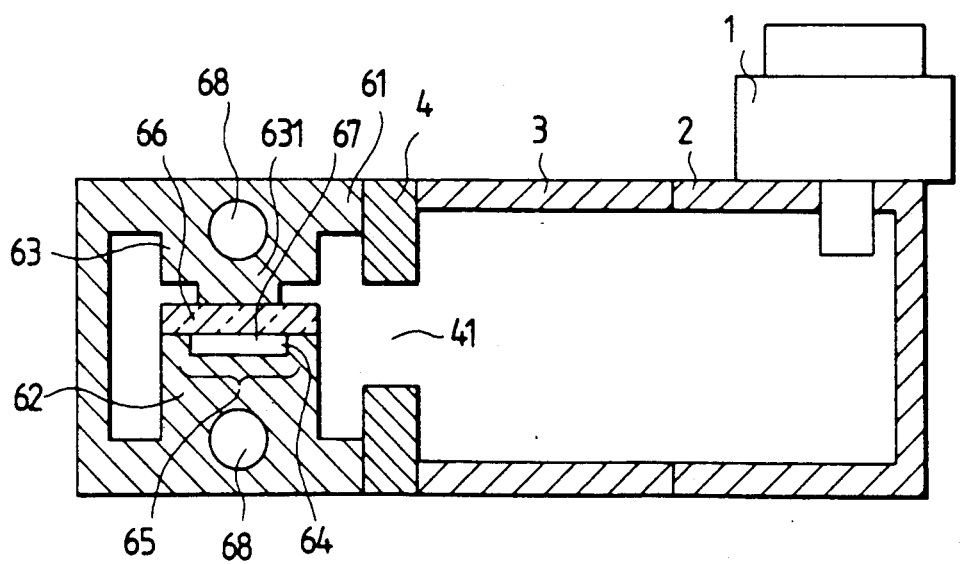
FIG. 7 is a sectional view taken along line B—B of FIG. 6, FIGS. 8 (a), 8(b) and 8(c) are a perspective view, a plan view and a side view of an unstable resonator, respectively, for describing a laser mode region formed by the resonator.

Next, a third embodiment in which a one-dimensional unstable resonator is used in a gas laser device utilizing microwave discharge, will be described. FIGS. 6 and 7 show an example of the gas laser device utilizing the microwave discharge. In the figures, reference numeral 11 designates a magnetron for generating a microwave; 12, a waveguide for propagating the microwave produced by the magnetron 11; 13, a horn waveguide increasing the width of the waveguide 12; 14, a microwave coupling window; 5, a laser resonator mirror; and 6, a laser head.

FIG. 7 is an enlarged sectional view taken along line B—B in FIG. 6, showing the laser head 6 in detail. As shown in FIG. 7, the laser head 6 has the structure of a ridge waveguide type microwave cavity which is a kind of microwave circuit. In FIG. 7, reference numeral 61 designates a cavity wall continuous to the microwave coupling window 14; 62 and 63, ridges formed at the central part of the section of the cavity wall 61; 64, a groove formed in the ridge 62; and 65, a conductor wall forming a part of the microwave circuit, the conductor wall 65 being the wall of the groove 64. The width of tip portion 631 of the ridge 63 is narrower than that of the groove 64. Further in FIG. 7, reference numeral 66 designates a dielectric member of alumina or the like confronted with the conductor wall 65; 67, a discharge space formed between the conductor wall 65 and the dielectric member 66 covering the groove 64, the discharge space 67 being filled with a $CO_2$ laser gas for instance; and 68, cooling water paths formed in the ridges 62 and 63.

In the gas laser device thus constructed, the microwave generated by the magnetron 11, passing through the waveguide 12, is spread at the horn waveguide 13 and impedance-matched at the microwave coupling window 41 formed in the end wall 14 of the horn waveguide 13 so as to be efficiently coupled to the laser head 6. The laser head 6 is in the form of a ridge cavity as shown in FIG. 7, and therefore the microwave is concentrated at the space between the ridges 62 and 631. The laser gas filled in the discharge space 67 is subjected to breakdown by the strong electric field of the microwave thus concentrated, thus generating plasma to excite the laser medium. Under this condition, cooling water is allowed to flow in the cooling water paths 68 to cool the discharge plasma, while discharge conditions such as the pressure of the laser gas are suitably selected, whereby laser oscillating conditions are satisfied. Thus, a laser beam is obtained with a laser resonator formed with the mirror 5 in FIG. 6 and another mirror (not shown).

In the case where, as in the case of the ridge cavity, the microwave circuit forms a microwave mode with an electric field component perpendicular to the boundary between the dielectric member 66 and the plasma, since the dielectric member 66 is confronted with the conductor wall 65, the perpendicular electric field is applied to the conductor wall 65; that is, the electric field penetrating the plasma is formed. Even if, in this case, a conductive plasma is produced, since the dielectric member 66 which is an microwave incident window is confronted with the conductor wall 65 which is much higher in conductivity than the plasma, the end current of the incident microwave flows in the conductive wall 65, and the electric field near the conductor wall 65 is forcibly made perpendicular to the surface of the conductive wall 65, whereby the electric field penetrating the plasma is maintained. Hence, the microwave permeates the plasma, and the current penetrating the plasma flows. Because of the continuity of the current, a discharge plasma spatially uniform is obtained, and the laser oscillation is performed.

Figure 8A:
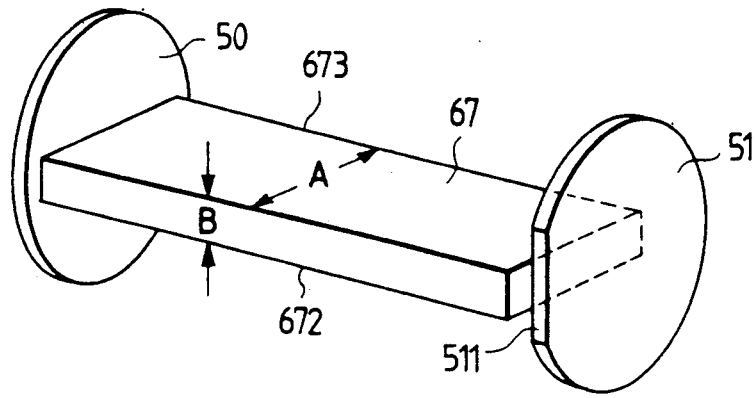
Figure 8B:
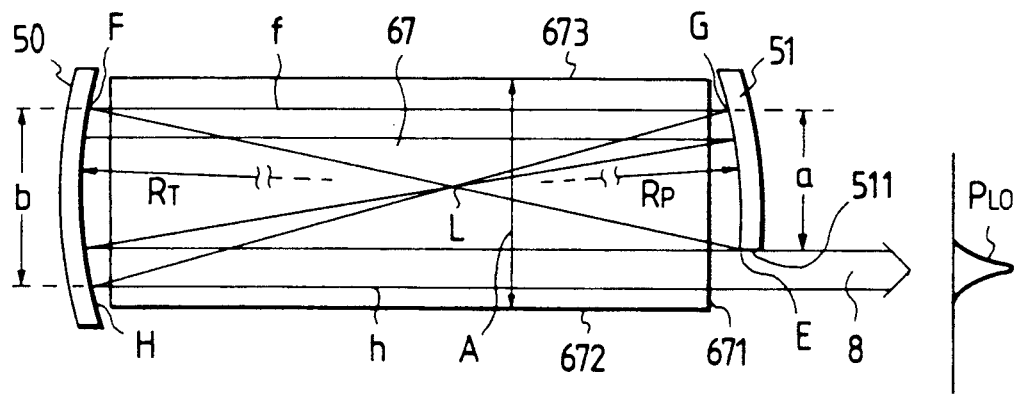
Figure 8C:
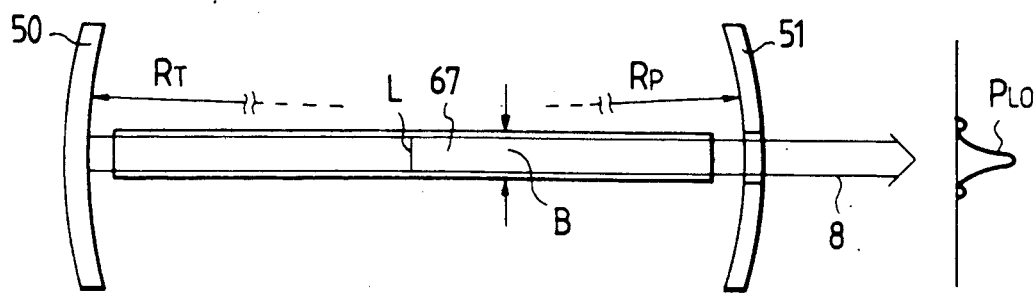

A laser resonator used for the above described laser devices is similar to that shown in FIG. 1. FIG. 8 is a view for describing a laser mode region formed by an unstable resonator.

In FIG. 8 (b), a light beam reflected by the exit total reflection mirror 51 at end E is then reflected by the total reflection mirror 50 at point F, and is then advanced along a line f. The light beam thus advanced is reflected by the mirror 51 at point G and then by the mirror 50 at point H, and is then advanced along a line h to go out of the resonator. The lines f and h are the outermost lines of the mode region of the unstable resonator made up of the total reflection mirror 50 and the exit total reflection mirror 51; that is, the light in the unstable resonator exists only between the lines f and h. The light between the end 511 of the exit total reflection mirror 51 and the line h is extracted as an output laser beam 8.

The distance between the outermost line h of the mode region and the end 511 of the exit total reflection mirror 51; that is, the width (b−a) of the laser beam 8 is made almost equal to the shorter dimension B of the discharge space section, whereby the laser beam 8 is symmetrical; that is, the laser beam 8 is a circular beam substantially symmetrical in divergent, angle as goes far. Thus, the laser beam is excellent in focusibility.

At the end portions of the discharge space 67, which are near the walls 672 and 673 of a groove forming the discharge space 67, the microwave's electric field is weak, and accordingly electric discharge scarcely occurs. Hence, the laser active scarcely exists at those end portions, and the laser beam may be absorbed. In order to eliminate this difficulty, the laser mode region is spaced at least 1 mm from the walls 672 and 673 so that it may not include the end portions of the discharge space 67. That is, the loss of the laser beam is minimized which may be caused when the latter is absorbed or contacts the walls 672 and 673.

When the width of the ridge end portion 631 is so selected that the laser mode region and the discharge region coincide with each other, the laser oscillation efficiency can be maintained excellent.

When the width of the groove was set to 24 mm and the width of the ridge end portion 631 was set to 20 mm, the width of the discharge region could be made 20 mm. In this connection, the curvatures and dimensions of the total reflection mirror 50 and the exit total reflection mirror 51 were so designed that the laser mode region be 20 mm in width. When, with the mirror spacing of 430 mm, the magnification factor; i.e, the ratio of the focal length (or radius of curvature) of the total reflection mirror 50 to the focal length (or radius of curvature) of the exit total reflection mirror 51 was set to 1.1:1, and the effective length a of the exit total reflection mirror 51 was set to 18 mm, the width of the laser mode region could be 20 mm. With the resonator, a laser oscillation efficiency of at least 15% could be obtained.

In the above-described embodiment utilizing the microwave, the negative branch unstable resonator is employed. However, the same effect can be obtained by using a positive branch unstable resonator in which a total reflection mirror is a concave mirror, and an exit total reflection mirror is a convex mirror.

As was described above, in the invention, the negative branch unstable resonator is provided only in the one dimension which is the longer side of the discharge space section. Therefore, although the focal point is located inside the resonator, the light is concentrated at one line instead of one point. Hence, the difficulty such as optical damage which is caused by the concentration of light at one point is eliminated, and the specific feature of the negative branch unstable resonator that is not so sensitive to inclination of the reflection mirrors can be maximumly utilized; that is, the resonator is improved in stability as much.

Further, the groove is formed in the conductive wall forming a part of the microwave circuit and confronting the dielectric member, and the discharge space is defined whose section perpendicular to the laser beam axis has vertical and horizontal dimensions different from each other. In the one dimension which is the longer side of the discharge space section, the unstable resonator is formed with the total reflection mirror and the exit total reflection mirror. The laser beam is obtained at the end of the longer side which is on the exit total reflection mirror side, and the distance between the outermost part of the laser mode region and the end of the exit total reflection mirror is made substantially equal to the dimension of the shorter side of the discharge space section. Therefore, the gas laser device according to the invention can generate a laser beam excellent in focusibility. Furthermore, since the laser mode region is spaced at least 1 mm from the wall forming the shorter side of the groove, the gas laser device is less in the loss of a laser beam and excellent in efficiency. In addition, the ridge is formed on the conductor wall confronted through the dielectric member with the groove, and the width of at least the end portion of the ridge is made smaller than the width of the groove, so that the region for producing plasma in the discharge space is substantially coincided with the laser mode region. The resultant gas laser device will operate with considerably high efficiency.

What is claimed is
1. A gas laser device, comprising:
a discharge space in which a laser gas is excited by electric discharge, said discharge space being in the form of a slab whose section perpendicular to a laser optical axis has a longer side and a shorter side; and
laser resonator mirrors disposed at both ends of said discharge space, respectively, said laser resonant mirrors constituting a negative branch unstable resonator in a first dimension of said longer side of said section of said discharge space,
wherein an output laser beam is obtained at one end of said longer side of said section of said discharge space.

2. A gas laser device as claimed in claim 1, wherein said resonant mirrors constitute an optical waveguide resonator in a second dimension of said shorter side of said section of said discharge space.

3. A gas laser device as claimed in claim 1, wherein said resonant mirrors constitute an open resonator in a second dimension of said shorter side of said section of said discharge space.

4. A gas laser device, comprising:
a microwave circuit for producing plasma with a microwave to perform laser excitation;
a conductor wall forming a part of said microwave circuit;
a dielectric member confronting said conductor wall;
a discharge space formed with a groove, said groove being formed in said conductor wall and being located between said conductor wall and said dielectric member, a section of said discharge space perpendicular to a laser beam axis having a longer side and a shorter side and said discharge space being filled with a laser gas from which said plasma is produced by said microwave circuit forming a microwave mode having an electric field component perpendicular to a boundary between said dielectric member and said plasm; and
a total reflection mirror and an exit total reflection mirror constituting a laser resonator;
wherein an unstable resonator is constituted with said total reflection mirror and said exit total reflection mirror in a first dimention of said longer side of said section of said discharge space;
an output laser beam is obtained at one end of said longer side at said exit total reflection mirror side; and
a distance between an outermost part of a laser mode region formed with said total reflection mirror and said exit total reflection mirror and an end of said exit total reflection mirror is made substantially equal to a dimension of said shorter side of said section of said discharge space.

5. A gas laser device as claimed in claim 4, wherein said laser mode region of said unstable resonator is spaced at least 1 mm from a wall of said groove which forms a shorter side thereof.

6. A gas laser device as claimed in claim 4, wherein a ridge is formed on a portion of said conductor wall confronted through said dielectric member with said groove, and a width of at least an end portion of said ridge is made smaller than a width of said groove so that a region for producing said plasma is substantially coincided with said laser mode region formed with said total reflection mirror and said exit total reflection mirror.

* * * * *